Oct. 23, 1951    C. A. MOELLER    2,572,649
BLIND FLYING INDICATOR FOR ROTARY WING AIRCRAFT
Original Filed June 12, 1945    2 SHEETS—SHEET 1
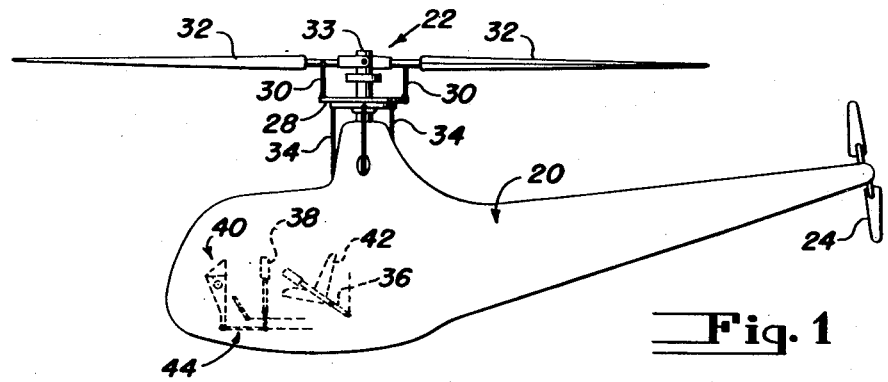
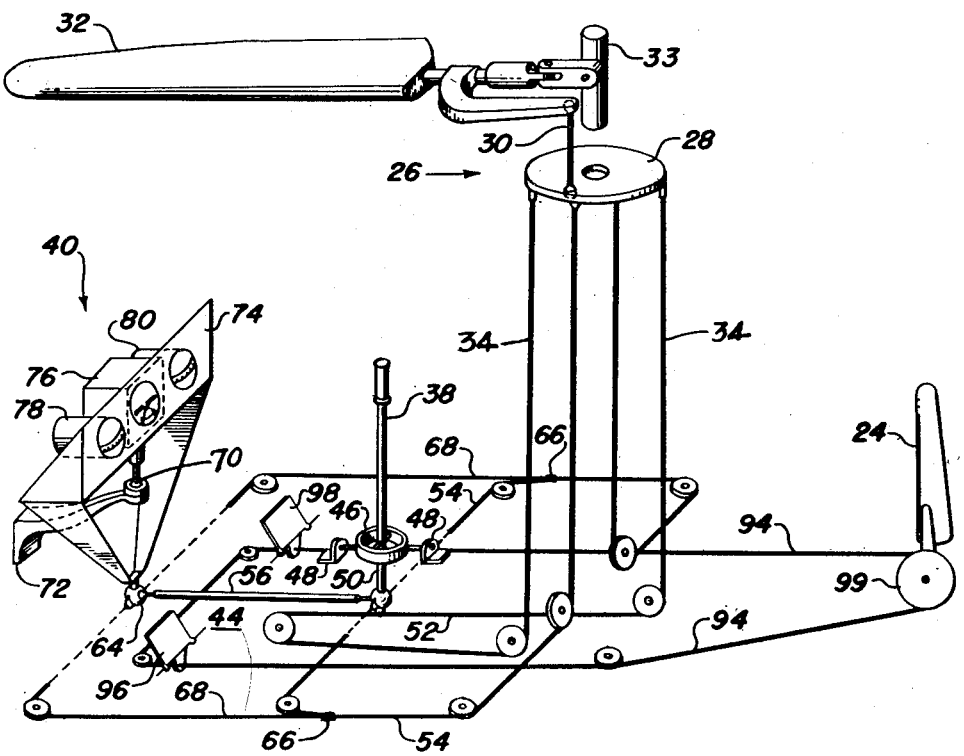
C. A. MOELLER
INVENTOR
BY M. B. Tasker
ATTORNEY

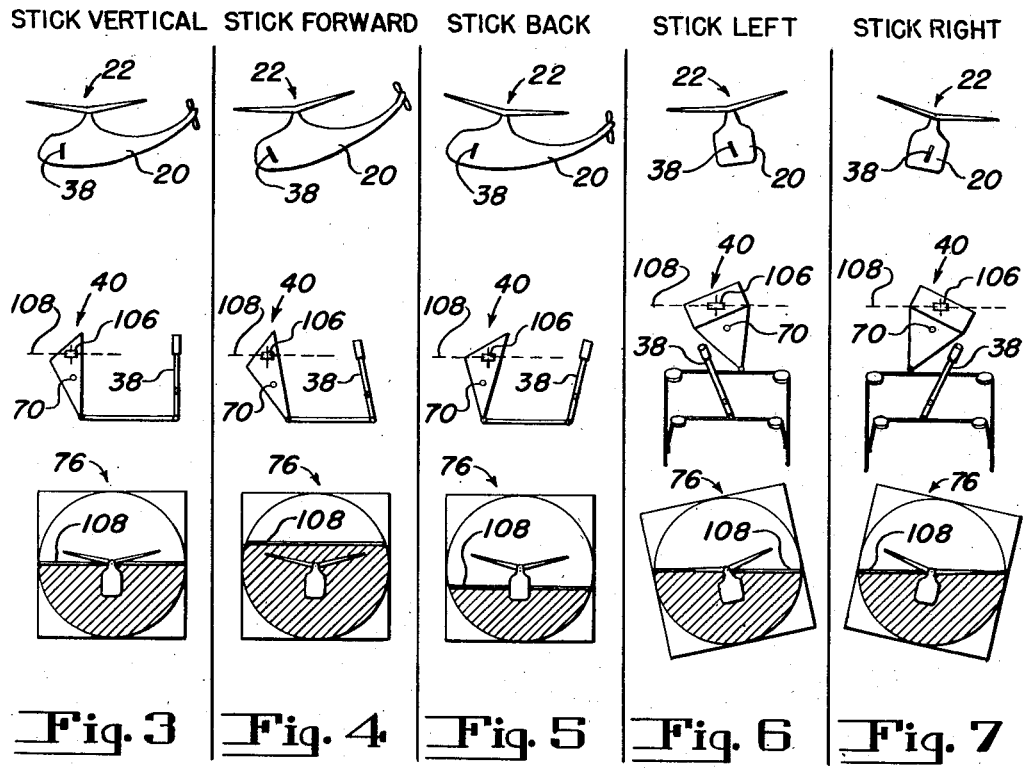

Patented Oct. 23, 1951

2,572,649

UNITED STATES PATENT OFFICE 2,572,649

BLIND FLYING INDICATOR FOR ROTARY WING AIRCRAFT

Constand A. Moeller, Orange, Conn., assignor to United Aircraft Corporation, East Hartford, Conn., a corporation of Delaware Original application June 12, 1945, Serial No. 599,005, now Patent No. 2,443,192, dated June 15, 1948. Divided and this application May 8, 1948, Serial No. 25,965

8 Claims. (Cl. 244—17.11)

This is a division of applicant's copending application Serial No. 599,005 filed June 12, 1945, now Patent No. 2,443,192, issued June 15, 1948.

The present invention relates to blind flying indicators for a helicopter.

It is an object of the present invention to provide indicating and flying aid means for rotary wing aircraft.

It is a further object of the invention to provide mechanism for obtaining a reference between a part of a rotary wing aircraft and one or more positions in space for aiding the pilot in operating the craft.

The foregoing and other objects will be either obvious or will be pointed out in the following specification and claims, in view of the accompanying drawings, in which Fig. 1 is an external view of a helicopter showing my invention therein in dotted lines;

Fig. 2 is a diagrammatic view partly in perspective illustrating the control mechanism of the invention; and Figs. 3, 4, 5, 6 and 7 are diagrammatic views of portions of a helicopter and of my invention in different attitudes of flight.

A helicopter, when in flight, may encounter different conditions and attitudes because of the fact that the sustaining rotor (or rotors) is used to propel the craft. In normal translational flight, the tip path plane of the rotor is tilted so that a horizontal component of force exerted by the rotor will propel the craft in any direction. The position in space that the tip path plane takes will correspond, or be in relationship, to the position of a part or parts of the helicopter. In other words, the tip path plane becomes tilted with respect to the fuselage of the craft and also with respect to the drive shaft, to the rotor carried by the fuselage, and also with respect to the horizon.

However, in all helicopters and other rotary wing aircraft, it is not always the case that fixed parts of the craft bear a uniform relationship to the tip path plane of the rotor. It has been found, however, that the position in space of the manual control stick for controlling the attitude of the craft both longitudinally and laterally bears a definite relationship to the attitude of the tip path plane in space. Thus, when the control stick is moved forwardly, the tip path plane will be inclined forwardly. As the control stick is moved backwardly, the tip path plane will be inclined backwardly and a rearward force will act upon the craft. Likewise, as the stick is moved to the right or to the left, the tip path plane will be inclined toward the right or left as the case may be. This is true both for helicopters which fly level and for those which tilt in space.

When a helicopter is flying, it may encounter fog or clouds, and may fly at night, or encounter other conditions in which poor visibility prevails. At such time, it is necessary for the pilot to know the attitude of the sustaining rotor or rotors with respect to the earth. In the present invention, use is made of the fact that the movement of the control stick has a relationship with the change of attitude of the tip path plane of the rotor. This relationship may be modified for different speeds and location of the center of gravity of the craft to a certain extent. Indicating means are connected with the control stick to indicate the attitude of the tip path plane so that the pilot may correct the attitude of his craft in accordance with the referencing means. As will be pointed out more fully hereinafter, the tip path plane also tilts with respect to the fuselage, and the foregoing is not intended to limt my invention to control of helicopters, or the like, from the control stick alone.

In the present invention, a gyroscopic horizon is used to indicate the vertical position, and a directional gyroscope is used to indicate direction. However, it will be understood that other vertical indicating means could be used, and a compass could be used to indicate direction. It would be further obvious to employ radio direction indicating means to control direction or to indicate vertical. Also, because a helicopter is capable of hovering in a fixed position in the air, sonic means could be used to indicate position with respect to the earth as well as the distance to the earth.

Referring now to Fig. 1, a helicopter 20 is shown diagrammatically, but it should be understood that other types of rotary wing aircraft could be likewise controlled by the mechanism to be described hereinafter. The helicopter 20 has a rotor 22 driven by an engine, not shown. The rotor could be turned by other means such as jet propulsion, for example, or be driven by the relative wind. A torque compensating rotor 24 is mounted upon the empennage portion of the helicopter 20. A control mechanism 26 comprises a tilt plate 28 and rods 30 connected to the rotor blades 32 to control the pitch and angle of attack of the rotor blades 32. Control means 34 are connected to the tilt plate 28 and extend down into the body of the helicopter 20. Although many different forms of control mechanism are known, that type illustratively used here can tilt the plate 28 to vary the angle of attack of the blades 32 cyclically and may also be moved simultaneously up and down to control the total pitch of the blades 32 for changing the lift of the rotor 22. The total pitch function is controlled by a control lever 36 through suitable connections, not shown. Inasmuch as the operation of the instant invention does not depend directly upon the total pitch setting, this function will not be described.

The attitude of the helicopter and the direction of its movements are controlled by a control stick 38 through connections (see Fig. 2) to the control means 34. These connections may be compression-tension rods, cables, or hydraulic connections as desired without departing from the spirit of the present invention. A cable type of control will be described hereinafter for purposes of illustrating one method of practicing the instant invention.

An indicating mechanism 40 is mounted in the cockpit in front of the pilot's seat 42 in a position in which it can be readily viewed by the pilot at all times. The mechanism 40 is shown as being connected to the control stick 38 by connecting means 44, one form of which will now be described. As shown in Fig. 2, the control stick 38 is mounted in a gimbal joint 46 having its outer ring secured to brackets 48 carried by a part of the body of the helicopter 20. The bottom end 50 of the stick 38 connects to a longitudinal control cable 52 and a lateral control cable 54 having suitable attachments, not shown, of any conventional sort to permit movement in all directions in azimuth. These cables 52 and 54 pass through suitably arranged pulleys up to the tilt plate 28, and are connected thereto so that when the stick 38 is moved forwardly, the tilt plate 28 will be inclined forwardly, for example, and as the stick 38 is moved into any other position within its full range of movement, the tilt plate 28 will take a corresponding position. Thus, as the rotor blade 32 rotates around the shaft 33, it will be cyclically pitched depending upon the direction of the tilt of the plate 28.

Connected to the end 50 upon a universal connection is a push-pull rod 56 which connects at its other end to a universal joint 64 to the indicating and control mechanism 40. The cable 54 is attached by clips 66 to a cable 68 which passes over pulleys and also connects to the mechanism 40. With these connections to the mechanism 40, as the stick 38 is moved in any direction, the mechanism 40 will be moved accordingly, but not necessarily to the same extent.

The mechanism 40 is pivotally mounted upon a universal joint 70 carried by a bracket 72 that is secured to the body of the helicopter 20. Thus, if the point 64 of the mechanism 40 is moved in any direction, the entire housing of the mechanism 40 will rotate upon the universal joint 70 to be tilted into a position having a relationship to the position of the control stick 38. The position of the pivot 70 may be different from that shown to provide modified stick to housing motions, as desired.

The mechanism 40 has an upper housing 74 containing a vertical indicating gyroscope or the like 76, a directional gyroscope or the like 78, and other indicating or control mechanism 80 which may be used to indicate banks and turns, air speed, motor R. P. M., or any other desirable information.

The manual control means for the tail rotor 24 comprise foot pedals 96 and 98 carried upon the craft by pivots and connected to the cable 94 to rotate a pitch changing drum 99 to vary the angle of attack of the rotor blades 24. This mechanism may be of the type shown in Igor I. Sikorsky's Patent No. 2,318,259, for example. However, other desired directional control means could be controlled in a similar manner.

Figs. 3, 4, 5, 6 and 7 are diagrammatic views showing different portions of the craft in different attitudes, and my invention associated therewith.

Fig. 3 shows the helicopter 20 with the control stick 38 in the vertical position, and the rotor 22 substantially in alignment with the horizon so that a vertical line through the tip path plane thereof is normal to the horizon. Actually, the main rotor 22 will be slightly tilted to provide a side thrust to balance translational forces exerted by the torque compensating rotor. Under such conditions, the helicopter will be hovering and remain stationary with respect to the air. The indicating and control mechanism 40 will be in substantially a vertical position and the gyroscope 106 therein will indicate an artificial horizon parallel to the actual horizon line. The gyroscope 106 may carry a horizon line 108 shaded below and clear above (or suitably colored or indicated otherwise) to indicate the horizon line with respect to indicia in the form of an image of a helicopter upon the glass face of the artificial horizon indicating gyroscope 106. Thus, for the hovering condition of the stick 38, the indicator 76 will show substantially the indication of Fig. 3 and the pilot will observe that the attitude of his craft is proper for hovering.

In Fig. 4, the tip path plane of the rotor 22 is inclined forwardly to impart a horizontal force component to accelerate or drive the helicopter 20 forward. In such an attitude, the stick of the helicopter 20 will be inclined forwardly in space in proportion to the inclination of the tip path plane of the rotor 22. In some helicopters, the fuselage 20 flies forwardly in a tail-up attitude as indicated diagrammatically at the top of Fig. 4. However, other rotary wing aircraft fly with the empennage in somewhat different attitudes so it should be understood that the attitude of the control stick 38 is not necessarily in correspondence with a position relative to the body of the craft 20, but takes a position in space relative to the position of the rotor 22 in the craft herein described by way of example. With the stick moved forwardly as shown, the indicating and control mechanism 40 will be tilted and the glass face of the member 76 will move downwardly with respect to the horizon line 108 carried by the gyroscope 106. This is accomplished in the conventional gyroscope by reversing the linkage between the bar indicating the horizon and the gimbals of the gyroscope itself in order that the indicated position of the aircraft relative to the horizon will be the natural one. Thus, the pilot will observe that the helicopter rotor tip path plane is tilted forwardly and that the craft is in forward motion with respect to the supporting air.

In Fig. 5, the opposite case of that explained in connection with Fig. 4, is illustrated and the helicopter is in rearward motion, or decelerating.

For such motion, the rotor 22 is tilted backwardly and a component of force thereof is directed toward the rear. Under such conditions, the control stick 38 is inclined backwardly with respect to a line vertical to the horizon as determined by the gyroscope 106. The face of the vertical gyro 76 will be raised upwardly with respect to the horizon line 108 so that the pilot will know that the tip path plane of the rotor 22 is toward the rear and that he is in backward flight.

In Fig. 6, the condition and attitude of the helicopter when the stick is to the left is indicated, and is exactly opposite to the condition with the stick in the right position as shown in Fig. 7. Inasmuch as these functions are identical, only the stick left condition will be described. With the stock 38 moved to the left, the tip path plane of the rotor 22 will also tip to the left with respect to the horizon. The indicating and control mechanism will be rotated around the universal pivot 70 so that the image of the helicopter carried by the face of the vertical gyroscope 76 will also indicate that the tip path plane is to the left with respect to the artificial horizon line 108 carried by the gyroscope 106. Thus, the pilot of the helicopter 20 will know that his attitude is such as to move the helicopter to the left and can make a correction to trim the ship on course.

While only five attitudes of flight have been shown and described above, it will be clear that an infinite number of attitudes can be indicated and controlled by the mechanism 40. For example, in a diving bank to the left, a position of the image between that indicated in the lower parts of Figs. 4 and 6 would be seen. In a climbing bank to the right, the indicator would show an image at some point between the images shown in Figs. 5 and 7, for example. Thus, for any of the composite attitudes that a helicopter may take, the indicator carried upon the vertical gyroscope, or the like, will indicate the true attitude of the tip path plane of the rotor 22 with respect to the horizon. Therefore, the craft can be trimmed manually so that the force due to gravity acting upon the helicopter will keep the craft in a stable position as desired by the pilot for hovering or for flight in any desired direction.

It should be understood that in rotor systems of the type shown there is a relationship between the cyclic control stick and the tip path plane. For example, when the stick is tilted forward in space, the tip path plane will be inclined forward in space because of the imposed cyclic pitch. It is characteristic of this system that when the space reationship between the stick and the tip path plane is altered there will be a cyclic pitch imposed on the blades tending to restore the relationship regardless of fuselage position. As the tip path plane returns to its space relationship with response to the stick the amount of cyclic pitch imposed will be decreased, thus decreasing the rate of return and, therefore, tending to damp the restoration action.

*Operation*

In order to better understand the operation of my invention, the control applied by the operator of a helicopter under flight conditions should be understood. As a general rule a helicopter is not stable in any flight condition and, therefore, may not be flown "hands off." Assume that the ship is proceeding at a certain speed in forward flight and a gust hits the ship to move the nose downwardly, tending to increase the speed of the ship. To maintain the speed constant the stick is moved back to tilt the main rotor back from its original position to decelerate the ship. The nose of the ship will now tend to rise towards its former state and, if the stick is kept in the back position, the nose will overswing. Therefore, the pilot must move the stick forward towards the original position as the nose rises, thus anticipating the return to the stable condition. There may be a slight overswing but any such successive oscillations will be damped. An experienced pilot can correct the ship in approximately two oscillations while a wholly inexperienced pilot, on the other hand, might tend to build up progressively larger oscillations which would result in disaster.

It is evident, therefore, that proper control of the helicopter depends upon the pilot's anticipating the return movement of the helicopter towards the desired flight condition and applying the proper corrective forces.

While I have shown one embodiment which my invention may assume in practice, it will be evident that various changes may be made in the construction and arrangement of the parts without departing from the scope of the invention.

I claim:

1. In a helicopter, in combination, a fuselage, a rotor mounted on said fuselage having blades mounted for flapping and pitch changing movements, cyclic pitch control means for said blades including a pilot operated control member, tiltable means movable with said control means, mounting means for said tiltable means providing for tilting of the latter in space with movements of said control means, and indicating means on said tiltable means including an indicating gyroscope having an artificial horizon and a simulation of the helicopter located in front of said artificial horizon for indicating to the pilot without reference to the real horizon the required manual operation of said control member to effect a desired flight of said helicopter.

2. In a helicopter, in combination, a rotor including blades mounted for flapping and pitch changing movements, a fuselage and cyclic pitch control means for said rotor blade including a pilot operated control member, indicating means movable with said control member, mounting means for said indicating means providing for tilting of the latter in space with movements of said control member, said indicating means including a position indicating gyroscope having an artificial horizon and a simulation of the helicopter located in front of said artificial horizon for indicating the amount and direction of movement of said control member required to restore said helicopter to a given flight condition.

3. In a helicopter, a fuselage, a rotor including blades mounted for flapping and pitch changing movements, means for cyclically varying the pitch of said blades including a pilot operated member mounted in said fuselage for universal movement to vary the blade pitch, indicating mechanism mounted in said fuselage for universal movement including vertical and directional indicating gyroscopes, and means operatively connecting said member and said mechanism for moving the latter correspondingly in space about its universal mounting in response to movements of said member about the universal mounting for the latter.

4. In a helicopter, a fuselage, a rotor including blades mounted for flapping and pitch changing movements, means for cyclically varying the pitch of said blades including a pilot operated member mounted in said fuselage for universal movement to vary the blade pitch, indicating mechanism universally mounted in said fuselage having vertical and directional indicating gyroscopes including an artificial horizon thereon, and means operatively connecting said member and mechanism for tilting the latter correspondingly in space in response to blade pitch changing movements of said member.

5. In a helicopter, a fuselage, a rotor including blades pivotally mounted for flapping and pitch changing movements, means for cyclically varying the pitch of said blades to tilt the tip path plane of the rotor including tilt plate mechanism having operative connections to the several blades and a pilot operated control member having operative connections to said tilt plate mechanisms, indicating mechanism including a gyroscope mounted in said fuselage for universal tilting movement having a transparent face bearing an image of the helicopter and a gyroscopic element back of said face rotatable about a vertical axis carrying an artificial horizon visible through said face, and means for operatively connecting said control member and said indicating mechanism whereby movement of said control member to tilt said plate mechanism effects a corresponding tilting of said indicating mechanism and changes the relation of said artificial horizon relative to said image to indicate the position of the helicopter relative to the real horizon.

6. In a helicopter, a fuselage having a pilot compartment, a rotor including a hub and blades pivotally mounted on said hub for flapping movement and for pitch changing movement about their longitudinal axes, tilt plate mechanism, blade pitch changing connections between said plate mechanism and said blades, a manual control stick mounted in said compartment, operative connections between said stick and said plate mechanism for tilting the latter in space by corresponding inclinations of said stick to impose cyclic pitch changes on said blades and incline the tip path plane of the blades as they rotate through the air, indicating mechanism including a vertical gyroscope in said pilot compartment supported for universal tilting movement, said gyroscope having a transparent face bearing an image of the helicopter and a gyroscopic element back of said face carrying an artificial horizon visible through said face, and means for operatively connecting said indicating mechanism with said stick, whereby tilting movement of said stick in any direction effects a corresponding tilting of said mechanism.

7. In a helicopter, a fuselage, a rotor including blades pivotally mounted for flapping and pitch changing movements, means for applying cyclic pitch variation to said blades to tilt the tip path plane of the rotor including tilt plate mechanism having operative connections to the several blades and a tiltable pilot operated control member having operative connections to said plate mechanism, indicating mechanism having a universal mounting on said fuselage including a vertical gyroscope having a transparent face bearing an image of a helicopter and a gyroscope element carrying an artificial horizon visible through said face, and means operatively connecting said pilot operated member and said indicating mechanism for corresponding tilting movements.

8. In a helicopter, a fuselage, a rotor including blades pivotally mounted for flapping and pitch changing movements, means for controlling the pitch of said blades cyclically to tilt the tip path plane of said blades including a pilot operated stick mounted in said fuselage for universal movement about a point support, a tilt plate mechanism having operative connections to said blades for changing the pitch thereof cyclically and having an operative connection with said stick, a blind flying indicator having an artificial horizon and an image of the helicopter in front of said horizon, said indicator being mounted in said fuselage for universal movement about a point support, and means for operatively connecting said indicator to said stick, whereby movement of said stick in any direction to tilt said plate mechanism results in a like tilting movement of said indicator to give the pilot a visual indication of the position of the helicopter with reference to said horizon.

CONSTAND A. MOELLER.

REFERENCES CITED

The following references are of record in the file of this patent:

UNITED STATES PATENTS

| Number | Name | Date |
| --- | --- | --- |
| 2,270,875 | Hanson et al. | Jan. 27, 1942 |
| 2,382,460 | Young | Aug. 14, 1945 |
| 2,427,939 | Woods | Sept. 23, 1947 |
| 2,443,192 | Moeller | June 15, 1948 |